United States Patent [19]
Holman et al.

[11] Patent Number: 5,654,060
[45] Date of Patent: Aug. 5, 1997

[54] HIGH TEMPERATURE INSULATION SYSTEM

[75] Inventors: Wesley L. Holman, Renton; Frederick L. Knoll, Kent, both of Wash.

[73] Assignee: The Boeing Company, Seattle, Wash.

[21] Appl. No.: 491,095

[22] Filed: Jun. 16, 1995

[51] Int. Cl.[6] .................................................. B32B 1/04
[52] U.S. Cl. ...................... 428/68; 29/432; 29/455.1; 112/420; 112/441; 138/149; 428/70; 428/74; 428/76; 428/920; 442/10; 442/13; 442/271; 442/326
[58] Field of Search .................................. 428/70, 74, 68, 428/76, 251, 920; 112/420, 441; 29/432, 455.1; 138/149

[56] References Cited

U.S. PATENT DOCUMENTS

| H957 | 8/1991 | Borck | 29/432 |
|------|--------|-------|--------|
| 4,442,585 | 4/1984 | McGehee | 428/74 |

*Primary Examiner*—Nasser Ahmad
*Attorney, Agent, or Firm*—Christensen O'Connor Johnson & Kindness PLLC

[57] ABSTRACT

An insulating blanket for a bulkhead in an engine nacelle comprises a fabric backing layer, a central insulating core, a ceramic precursor-impregnated hot-side fabric layer and, as required, erosion-preventing wire mesh. The backing layer comprises a fiberglass fabric. The insulating core comprises a ceramic felt. The hot side layer comprises one or more layers of resin-impregnated fiber glass fabric. The blanket is precured to provide a predetermined geometric shape.

15 Claims, 2 Drawing Sheets

HIGH TEMPERATURE INSULATION SYSTEM

FIELD OF THE INVENTION

The present invention relates to insulation blankets and, more particularly, to high temperature insulation blankets such as those used in the nacelle of a jet engine.

BACKGROUND OF THE INVENTION

Under certain atmospheric and flight conditions, ice may tend to form on the leading edge or lip of a jet engine nacelle. This ice buildup on the lip skin will, of course, cause damage to the engine fan blades if allowed to build up, break loose and be ingested. It is therefore desirable to de-ice the lip skin during flight. To this end, hot engine air is ducted into the annular space between the forwardmost bulkhead of the nacelle and the lip skin. The hot air enters at one location, travels circumferentially around the annular space and exits at another location.

To assure that de-icing air is always available, the valve that controls the de-icing air is designed to fail in an open mode. However, when the valve fails in an open mode, high velocity hot air continuously travels through the circumferential space behind the lip skin raising the air temperature sometimes to on the order of 600 to 800 degrees. To insulate the structure and components mounted in the nacelle rearwardly of the first bulkhead, insulation blankets are installed. However, prior art insulation blankets cannot satisfactorily withstand the high temperatures and high air velocities that are encountered in an open-valve, failure mode of operation.

SUMMARY OF THE INVENTION

The present invention therefore provides a novel insulation blanket comprising a backing layer, a second insulating core overlying the backing layer, and a ceramic precursor-impregnated thermally and oxidatively stable fabric facing layer overlying the insulating core. The precursor is curable into a solid which will phase change into ceramic on being subjected to high temperatures. As required, an erosion prevention layer comprising a metal wire mesh is positioned to overlay the facing layer. This assembly is then stitched together using a high temperature resistant thread.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
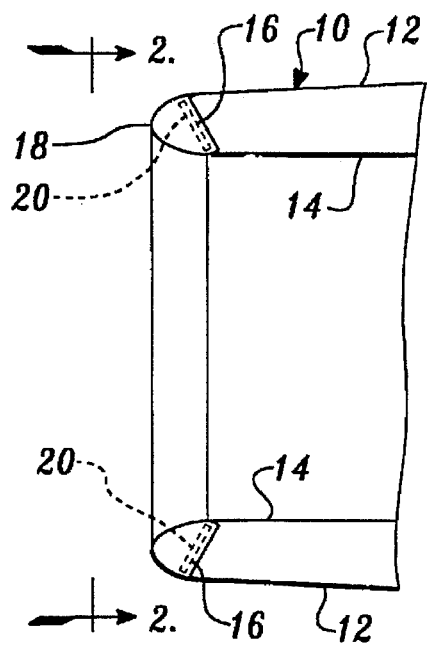
FIG. 1 is a typical schematic longitudinal sectional view of a jet engine nacelle showing the leading edge or lip and forwardmost bulkhead of the nacelle and showing the insulation blanket of the present invention in phantom.
Figure 2:
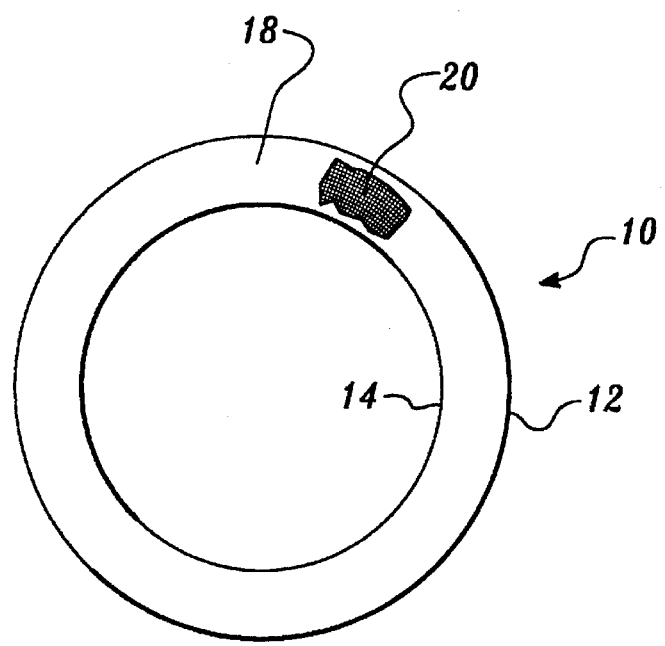
FIG. 2 is a front view of the nacelle with a portion of the lip cut away showing the insulating blanket in front of the bulkhead.

Referring to FIGS. 1 and 2, the engine nacelle 10 has an outer skin 12 and an inner skin 14 that terminate at a forwardmost bulkhead 16 adjacent the leading edge of the nacelle. The leading edge of the nacelle is formed by a lip skin 18 that extends forwardly and inwardly from the outer skin 12, reverses in direction, and then extends downwardly and rearwardly to join the inner skin 14. An annular interior space is thus formed between the lip skin 18 and the bulkhead 16. This is the space through which hot de-icing air circulates on demand. In order to protect the bulkhead 16 and the components positioned rearwardly of the bulkhead, an insulating blanket schematically shown as 20, is positioned on the forward surface of the bulkhead 16. In a preferred embodiment, the blanket is bolted and adhesively bonded to the bulkhead to secure it in place. Either attachment method or combination can be used.

Figure 3:
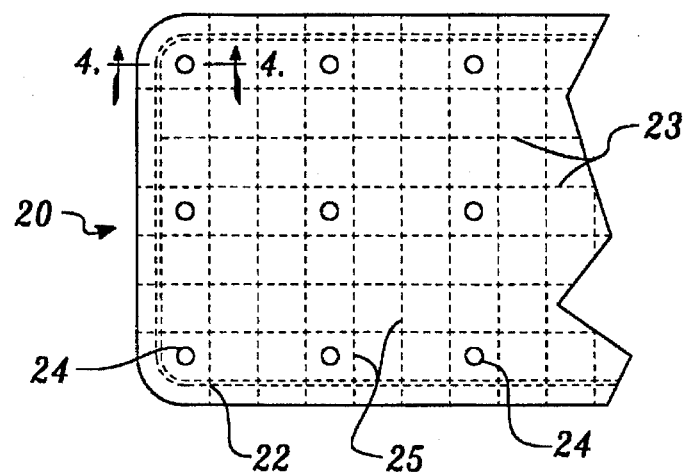
FIG. 3 is an enlarged front elevation view of a segment of the insulating blanket prepared in accordance with the present invention.

Referring to the enlarged view of FIG. 3, the insulation blanket is formed in arcuate circumferential sections, an end segment of one of which is illustrated. Any number of sections can be employed to complete a ring of insulation to match the shape of the bulkhead. As will be described in more detail later, the blanket comprises a plurality of layers. These layers are mechanically attached together by stitching with high temperature resistant thread. The outer edges of the blanket are double stitched as shown at 22, while circumferential and radial stitching 23, 25 is provided at preset intervals across the rest of the blanket. Also, grommets 24, extend through the insulation blanket and provide mounting apertures through which the blanket is affixed by suitable fasteners to the nacelle bulkhead. The grommets 24 are distributed in a predetermined spaced array so that the blanket can be firmly attached to the nacelle bulkhead. The near surface of the blanket is also preferably bonded to the bulkhead using a silicone adhesive to prevent hot air and fluids from penetrating to the back side of the blanket and secondarily to attach the blanket to the bulkhead.

Figure 4:
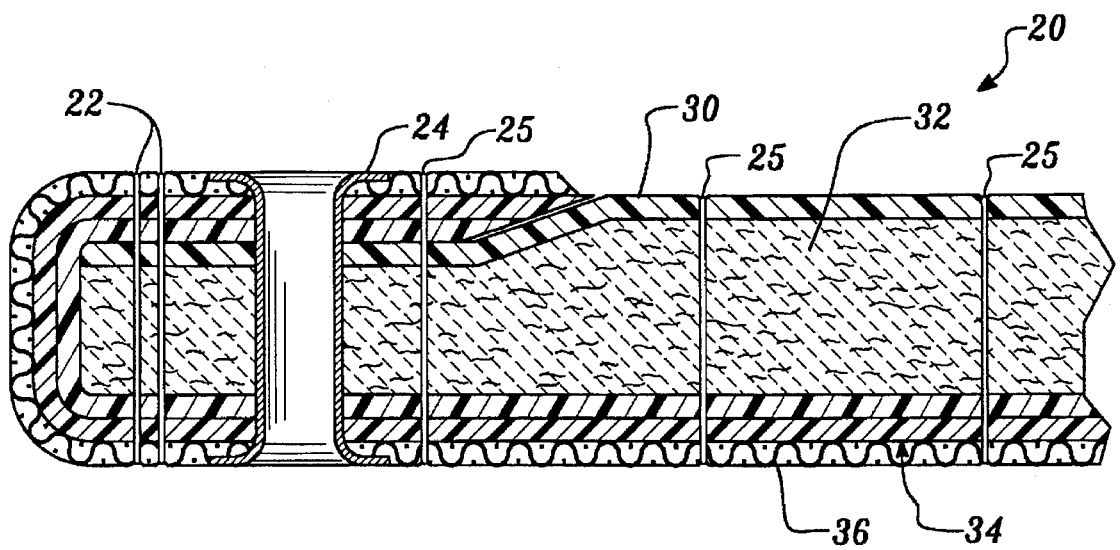
FIG. 4 is a greatly enlarged cross-sectional view taken along section line 4—4 of FIG. 3.

Referring now to FIG. 4, the blanket 20 comprises four distinct layers. A first backing layer 30 preferably comprises a dry fiberglass woven or nonwoven fabric which can be coated with a silicone sealant. Other materials such as metal foils or thermoplastic films can be employed, for example a polyimide film. The primary purpose of the backing layer is to contain the center insulating core, to seal the core from external fluids, and/or provide an attachment surface. This fabric is positioned on the cool (rear) side of the blanket that abuts the bulkhead of the nacelle. The center core 32 is comprised of an insulating felt or other suitable insulating material of adequate thickness to provide the necessary heat-insulating characteristics required to protect the bulkhead and components lying behind the bulkhead. In a preferred embodiment, a double layer 34 of a ceramic precursor-impregnated fiberglass fabric (woven or nonwoven) overlies the insulating felt 32. As required in areas of air impingement, the blanket can have a fine wire mesh 36 positioned on top of the resin-impregnated fiberglass layers 34. The ends of the outer layers of fabric, and when employed the ends of the wire mesh, are wrapped around the edge of the blanket to finish the blanket edges.

After the layers are positioned atop one another, the assembly is stitched together with a metal (e.g., nickel chromium), quartz, or other suitable high temperature resistant thread. It is intended that the term thread encompass conventional threads, monofilaments and cables. The insulation core material is preferably compressed approximately 50% which provides a spring back pressure on the face sheets and on the stitching. This prevents the hot side of the blanket from fluttering in a high velocity airstream. The resin is then cured to provide structural stiffening to the insulation blanket and to seal the insulation core material from environmental effects such as airstream, fluids, and vapors. Thereafter, holes are punched in the blanket and the grommets are inserted in a conventional manner.

The fabrics employed in the insulation blanket are preferably incombustible and preferably comprise fiberglass. The fiberglass fabric used on the cold side of the insulation blanket is available from Clark-Schwebel under the trade designation Style No. 116 or equivalent. Other examples of materials can be substituted for the fiberglass such as quartz fibers and ceramic cloth or organic cloth composed, for example, of graphite, aromatic polyamide (Kevlar), or polyester (Dacron) fibers. The ceramic precursor used to impregnate the fiberglass layers on the hot side of the blanket preferably comprises an organic resin that is oxidatively stable and is thermosetting. Preferably, an organic resin is employed that will, when subjected to high temperatures on the order of 600° F. to 800° F., undergo a phase transfer process into a ceramic material. A typical silicone-based resin that meets this criterion is available under the trade designation S826A from ICI Fiberite of Orange, California, and is preferable. The fiberglass fabric that is preferably employed is S2 glass available under the trade name Style No. 6581 from the same source or equivalent. The preimpregnated glass fabric is available from ICI Fiberite under the trade designation SM8030. The core of the insulating blanket is preferably on the order of 0.5 inches thick and comprises a ceramic insulation having a density of about 6 lbs. per cubic foot. Insulation core thickness and chemistry are chosen to meet specific heat resistance and durability requirements. A preferable insulation is available under the trade name LoCon Felt from the Carborundum Fibers Division, Niagara Falls, N.Y. Grommets can preferably be made of any suitable metallic material; however, stainless steel having ⅜ inch ID is preferred. The wire mesh can be manufactured from stainless steel, inconel or other suitable material. In its preferred form, the wire in the mesh has a diameter of 4 mils. The mesh preferably has a plain weave with 100×100 strands to the inch.

The insulation blanket is stitched together before the resin in the hot side fabric is cured. It is preferred that the circumferential stitching be on one-inch centers. It is also preferred that the edges be double stitched about 0.300 and 0.800 inches from the edge of the blanket. The radial stitching is also on a nominal one-inch spacing starting at the inside of the are and can reach up to one and one-half inches on the outside of the arc.

The curing procedure for the preferred silicone based resin requires that the blanket be cured on a predetermined tool surface. The blanket is vacuum bagged in a conventional manner and is placed in an oven. The vacuum is maintained at a minimum of 20 inches of mercury. The oven is then heated to dwell temperature at a rate of 2° to 10° F. per minute. The resin is cured at a dwell temperature of 350°±25° for a two-hour minimum period. The vacuum is maintained until the part has cooled to less than about 120° F.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An insulation blanket consisting essentially of:
   a backing layer for positioning next to an object to be shielded from heat;
   an insulating core overlaying said backing layer; and
   a thermally and oxidatively stable fabric facing layer impregnated with a ceramic precursor overlying said insulating core, said precursor being cured into a ceramic by subjecting it to a high temperature, said facing layer and ceramic being resistant to degradation upon exposure to hot gases.

2. The blanket of claim 1, wherein said backing layer is selected from the group consisting of fiberglass fibers, quartz fibers, ceramic fibers, and organic fibers.

3. The blanket of claim 1, wherein said core is selected from the group consisting of a ceramic felt, an alumina felt, and a microporous powdered silica.

4. The blanket of claim 1, wherein said facing layer is selected from the group consisting of fiberglass fibers, quartz fibers, and ceramic fibers.

5. The blanket of claim 1, said blanket being stitched together with a thread.

6. The blanket of claim 5, wherein said thread is selected from the group consisting of quartz fibers and nickel-chromium fibers.

7. The blanket of claim 1, wherein said precursor comprises a silicon-based resin.

8. An insulation blanket consisting essentially of:
   a backing layer for positioning next to an object to be shielded from heat;
   an insulating core overlaying said backing layer;
   a thermally and oxidatively stable fabric facing layer impregnated with a ceramic precursor overlying said insulating core, said precursor being cured into a ceramic by subjecting it to a high temperature, said facing layer and cured ceramic being resistant to degradation upon exposure to hot gases; and
   an erosion-prevention layer comprising a metal wire mesh overlying said facing layer, said erosion-prevention layer protecting said facing layer from erosion by high-velocity hot gases.

9. The blanket of claim 8, wherein said backing layer is selected from the group consisting of fiberglass fibers, quartz fibers, ceramic fibers, and organic fibers.

10. The blanket of claim 8, wherein said core is selected from the group consisting of a ceramic felt, an alumina felt, and a microporous powdered silica.

11. The blanket of claim 8, wherein said facing layer is selected from the group consisting of fiberglass fibers, quartz fibers, and ceramic fibers.

12. The blanket of claim 8, wherein said mesh is selected from the group consisting of stainless steel and inconel wire.

13. The blanket of claim 8, said blanket being stitched together with a thread.

14. The blanket of claim 13, wherein said thread is selected from the group consisting of quartz fibers and nickel-chromium fibers.

15. The blanket of claim 14, wherein said precursor comprises a silicon-based resin.

* * * * *

UNITED STATES PATENT AND TRADEMARK OFFICE
CERTIFICATE OF CORRECTION

PATENT NO. : 5,654,060
DATED : August 5, 1997
INVENTOR(S) : W.L. Holman et al.

It is certified that error appears in the above-indentified patent and that said Letters Patent is hereby corrected as shown below:

COLUMN      LINE

4            6           "overlaying" should read --overlying--
(Claim 1,   line 4)

Signed and Sealed this

Twentieth Day of January, 1998

Attest:

BRUCE LEHMAN

Attesting Officer    Commissioner of Patents and Trademarks